United States Patent [19]
Haberkorn

[11] Patent Number: 5,506,020
[45] Date of Patent: Apr. 9, 1996

[54] INSULATED FREIGHT CONTAINER QUILT

[76] Inventor: Robert W. Haberkorn, 8809 Prestwick La., Orland Park, Ill. 60462

[21] Appl. No.: 935,253

[22] Filed: Aug. 27, 1992

[51] Int. Cl.⁶ ................................................. B32B 3/06
[52] U.S. Cl. .................... 428/102; 150/154; 150/901; 206/545; 220/15; 410/121; 410/155; 428/74; 428/76; 428/101; 428/121; 428/126; 428/192; 428/194; 428/394; 428/395; 428/483; 428/516; 428/920
[58] Field of Search ................ 428/102, 74, 76, 428/192, 194, 126, 53, 54, 100, 220, 394, 395, 483, 516, 920, 101, 121; 150/154, 901; 410/121, 155; 52/408, 3; 215/12.1, 13.1; 220/1.5; 206/545

[56] References Cited

U.S. PATENT DOCUMENTS

| | | | |
|---|---|---|---|
| 1,460,461 | 7/1923 | West | 150/154 |
| 1,579,560 | 4/1926 | Moore | 312/31.03 |
| 1,594,358 | 8/1926 | Dunn, Jr. et al. | 150/901 |
| 1,595,385 | 8/1926 | Cusack | 426/109 |
| 1,639,418 | 8/1927 | Washburn | 220/448 |
| 1,647,169 | 11/1927 | Anton | 150/154 |
| 1,669,061 | 5/1928 | Meltzer | 215/11.6 |
| 1,895,277 | 1/1933 | Crawford | 383/96 |
| 1,949,677 | 3/1934 | Crawford | 383/96 |
| 2,170,969 | 8/1939 | Houghton | 220/448 |
| 2,522,381 | 9/1950 | Kramer | 215/12.1 |
| 2,808,093 | 10/1957 | Gilman | 206/599 |
| 2,857,949 | 10/1958 | Ziff | 383/33 |
| 3,088,619 | 5/1963 | Boucher | 220/1.5 |
| 3,185,197 | 5/1965 | Spiro et al. | 150/154 |
| 3,199,481 | 8/1965 | Handwerker | 428/102 |
| 3,470,928 | 10/1969 | Schwartz | 383/117 |
| 3,659,641 | 5/1972 | Marino | 206/597 |
| 3,783,766 | 1/1974 | Boucher | 52/2.23 |
| 3,906,129 | 9/1975 | Damois | 428/99 |
| 4,001,996 | 1/1977 | Byrd | 428/121 |
| 4,182,063 | 1/1980 | Klosel | 40/610 |
| 4,301,920 | 11/1981 | Boggs | 150/52 R |
| 4,587,682 | 5/1986 | Schultz | 5/413 |
| 4,590,714 | 5/1986 | Walker | 52/3 |
| 4,620,396 | 11/1986 | Bjorntwedt | 52/3 |
| 4,653,290 | 3/1987 | Byrne | 62/372 |

*Primary Examiner*—Nasser Ahmad
*Attorney, Agent, or Firm*—Wood, Phillips, VanSanten, Clark and Mortimer

[57] ABSTRACT

An insulated freight container quilt comprises first and second elongate cover sheets coated on an outer side with polypropylene fiber, the cover sheets being of a material selected from a group of spun bonded polypropylene and spun bonded polyester. A batt of polyester staple fibers mounted together with an acrylic binder is sandwiched between inner sides of the first and second sheets. A seam structure along perimeter edges of the sheets secures the batt between the sheets.

18 Claims, 3 Drawing Sheets

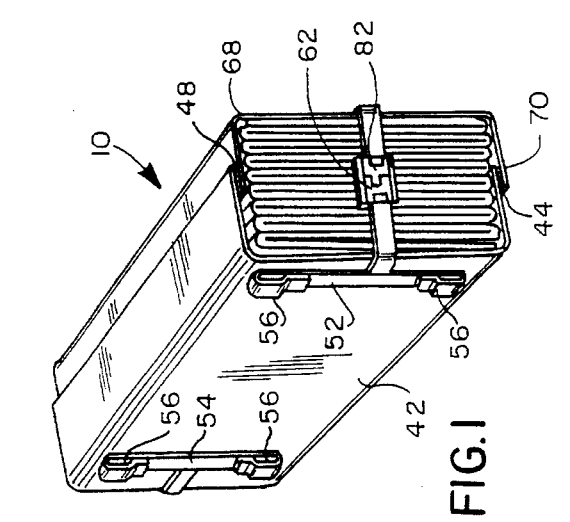
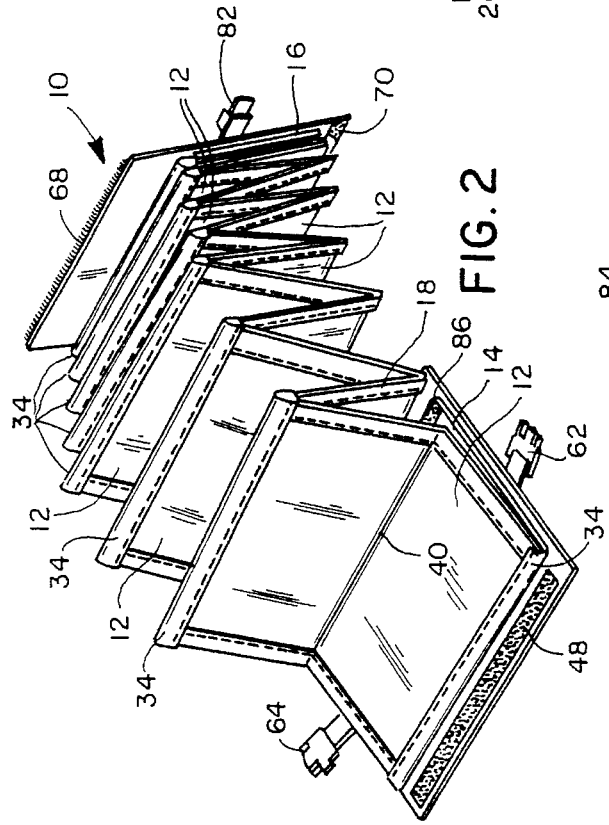
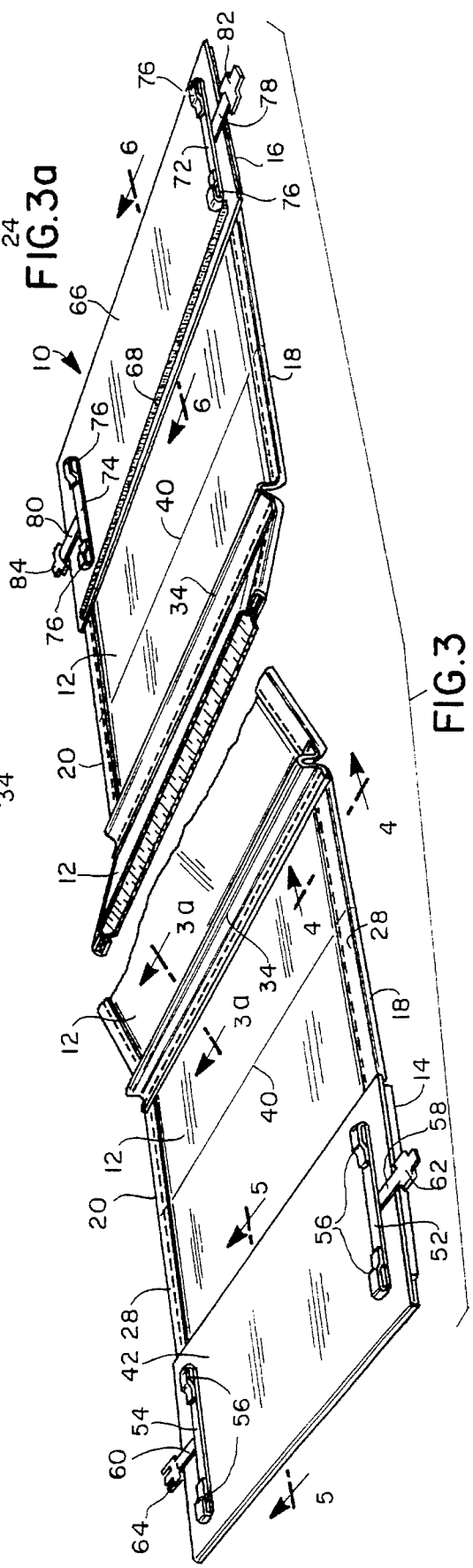

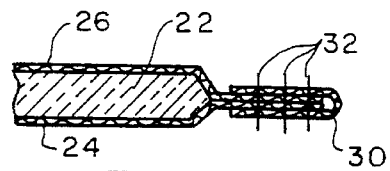
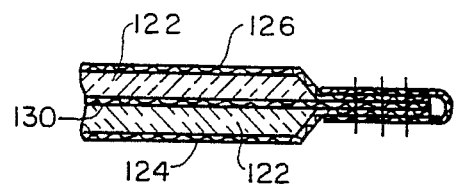
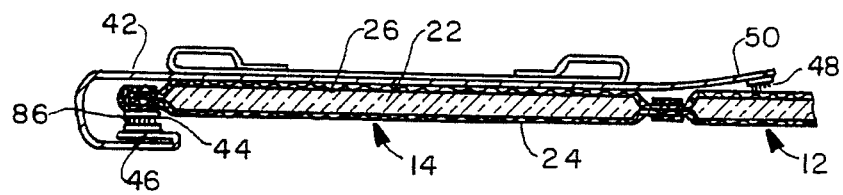
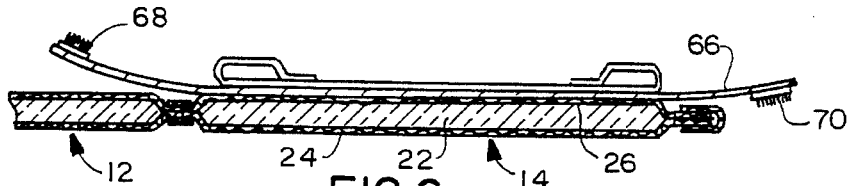
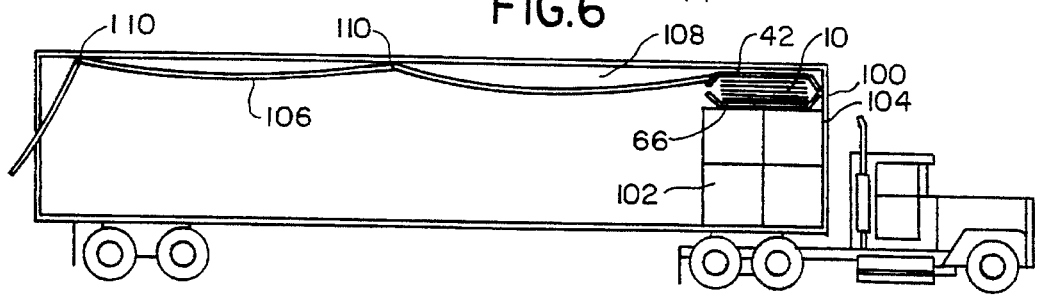
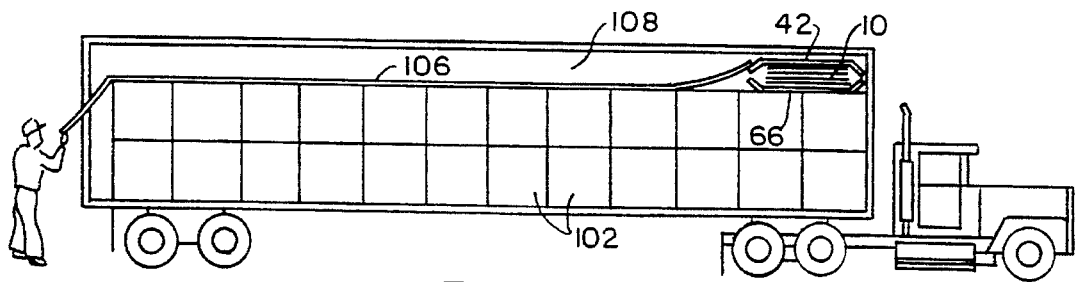
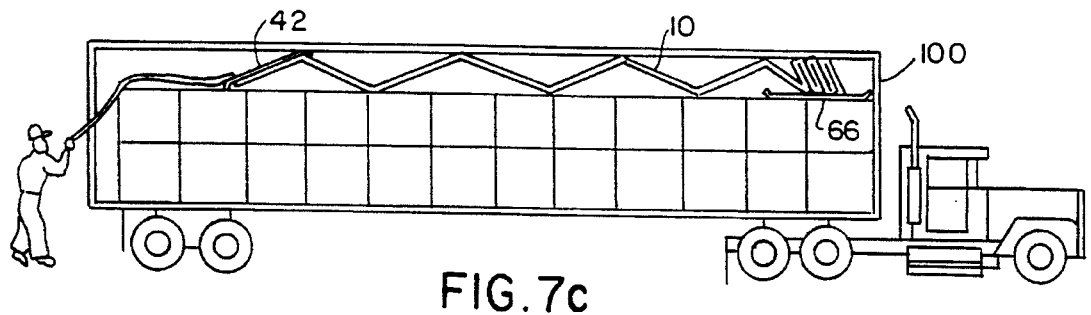

INSULATED FREIGHT CONTAINER QUILT

FIELD OF THE INVENTION

The disclosed subject matter relates to the shipment of freight and, more particularly, to an insulated freight container quilt.

BACKGROUND OF THE INVENTION

Shipping of goods is required to bring the same to market or to areas of further manufacture. Typically, the goods are placed in cartons and/or placed on pallets to facilitate storage and handling. These goods may be shipped by land, sea or air, as necessary or desired.

Depending on the nature of the goods, requirements may exist for strict temperature control. For example, frozen goods, such as ice cream, must be maintained in a frozen condition. This requires the use of refrigerated shipping vessels. Other food products, such as beer or wine, are not quite as sensitive to temperature. Nevertheless, it may be necessary to maintain the goods at a cooler temperature and, more particularly, to prevent significant temperature swings during long shipments. While refrigerated vessels satisfy this requirement, they do so at great expense.

Alternatively, shippers have occasionally used insulated tarpaulins or the like to cover the goods during shipment to provide some measure of temperature control. Depending upon the makeup of the tarpaulin, it may have less than desirable insulation characteristics. Further, for large shipments, such as in a semi-trailer truck, placing the tarpaulin over the goods may prove quite difficult and cumbersome.

The disclosed subject matter is intended to solve one or more of the problems discussed above in a novel and simple manner.

SUMMARY OF THE INVENTION

Broadly, there is disclosed herein an insulated freight container quilt which is easily storable and usable.

Broadly, there is disclosed herein an insulated freight container quilt including a plurality of insulated rectangular panels, each panel comprising an insulation batt sandwiched between an upper sheet and a lower sheet. Means are provided for securing the panels together to provide an elongate quilt, the panels being aligned seriatim with longitudinal edges in alignment and transverse edges of adjacent such panels being secured together. Means define fold means at the transverse edges of the secured panels for folding the elongate quilt into a stack. Securing means are operatively associated with opposite end panels of the elongate quilt for securing the opposite end panels together to maintain the stack therebetween.

It is a feature of the invention that the securing means comprises the panels being fastened together by stitches.

It is another feature of the invention that the folding means further comprises alternate transverse fold lines centrally located in the panels intermediate the transverse edges.

It is an additional feature of the invention that the opposite end panels are one-half as long as the other said panels.

It is a further feature of the invention that the securing means comprises a fabric cover secured to one side of each of the opposite end panels.

It is an additional feature of the invention that the securing means further comprises quick release locking means secured at longitudinal edges of the covers for the opposite end panels for locking the covers together sandwiching the stack.

It is yet an additional feature of the invention that the securing means further comprises self-locking strips secured at transverse edges of the covers to the opposite end panels for locking the covers together sandwiching the stack.

It is yet a further feature of the invention to provide hanging strips secured to one of the end panels for storing the quilt in a shipping vehicle as by hanging the quilt using straps.

In accordance with another aspect of the invention there is disclosed an insulated freight container quilt including a plurality of insulated rectangular panels, each panel comprising an insulation batt sandwiched between inner and outer sheets, the panels being aligned seriatim between opposite end panels with longitudinal edges in alignment. A first seam structure along opposite longitudinal edges of each panel secures the batt between layers. A second seam structure along opposite transverse edges of each panel secures the batt between layers, the transverse edges of adjacent panels being secured together to provide an elongate quilt. Means defining fold lines at the transverse edges of the secured adjacent panels are provided for folding the elongate quilt into a stack with the end panels defining outermost panels in the stack. Securing means are operatively associated with the opposite end panels for temporarily securing the opposite end panels together to maintain the stack therebetween for storage of the quilt.

In accordance with a further aspect of the invention there is disclosed an insulated freight container quilt comprising first and second elongate sheets coated on an outer side with polypropylene fiber, the sheets being of a material selected from a group of spun bonded polypropylene and spun bonded polyester. A batt of polyester staple fibers mounted together with an acrylic binder is sandwiched between inner sides of the first and second sheets. A seam structure along perimeter edges of the sheets secures the batt between the sheets.

Further features and advantages of the invention will readily be apparent from the specification and from the drawing.

BRIEF DESCRIPTION OF THE DRAWING

FIG. 1 is a perspective view of an insulated freight container quilt according to the invention in its stored condition;

FIG. 2 is a perspective view of the quilt of FIG. 1 partially unfolded;

FIG. 3 is a partial, perspective view of the quilt of FIG. 1 shown fully unfolded;

FIG. 3a is a sectional view taken along the line 3A—3A of FIG. 3;

FIG. 4 is a sectional view taken along the line 4—4 of FIG. 3;

FIG. 4a is a sectional view similar to that of FIG. 4 for an alternate quilt construction;

FIG. 5 is a sectional view taken along the line 5—5 of FIG. 3;

FIG. 6 is a sectional view taken along the line 6—6 of FIG. 3;

FIGS. 7a–7e illustrate sequentially the steps for positioning the quilt of FIG. 1 in a semi-trailer truck and for subsequently removing the same;

DETAILED DESCRIPTION OF THE INVENTION

Figure 7D:
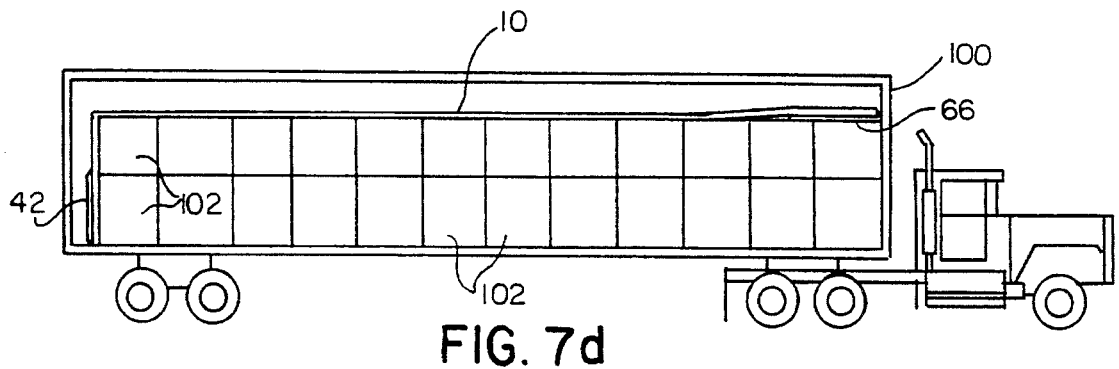

Referring to FIGS. 1–3, an insulated freight container quilt 10 according to the invention is illustrated in different states of use. Particularly, FIG. 1 illustrates the quilt 10 in its stored and secured state. FIG. 2 illustrates the quilt 10 in an unsecured state. FIG. 3 illustrates the quilt 10 in the substantially fully unfolded state ready for use.

The quilt 10 comprises a plurality of insulated rectangular panels 12 aligned seriatim between opposite end panels 14 and 16 with opposite longitudinal edges 18 and 20 in alignment. The particular size of each panel 12 is determined by the application. The quilt is used to cover the top of the load in a freight trailer. Thus, the particular size and number of panels 12 is determined by the trailer size. For use with typical trailers, the panels 12 would be eight foot square to extend across a 96 inch wide trailer. Six panels 12 would be used, for a total of forty-eight feet in length plus an additional eight feet provided by the end panels 14 and 16 which are each four feet long by eight feet wide, or half the size of the intermediate panels 12.

For wider trailers, 102 inch wide panels 12, 14 and 16 may be used. Similarly, for shorter trailers, a twenty-eight foot total length is satisfactory.

Each of the panels 12, 14 and 16, comprises an insulation batt 22 sandwiched between an inner sheet 24 and an outer sheet 26, see FIG. 4. The insulation batt 22 is preferably a batt of polyester staple fibers bonded together with an acrylic binder. Particularly, the batt 22 is formed using Hollofil® synthetic fibers (Hollofil® is a registered trademark of E. I. DuPont de Nemours and Co.). These are polyester, continuous, non-linear fibers. The use of such fibers with an acrylic binder provides a spongy and resilient batt of insulation. The batt 22 is sandwiched between inner sides of the inner and outer cover sheets 24 and 26, respectively.

The inner sheet 24 and outer sheet 26 of each panel 12, 14 and 16, is formed of either spunbonded polypropylene or spunbonded polyester. Particularly, the sheets 24 and 26 may comprise Typar® spunbonded polypropylene (Typar® is a registered trademark of E. I. DuPont de Nemours and Co.), or Reemay® spunbonded polyester (Reemay® is a registered trademark of E. I. DuPont de Nemours and Co.). With either material, the sheet may be selected with a substrate unit weight of approximately 2.1 ounces per cubic yard and is coated on one side with 0.5–1.0 mil thickness of polypropylene fiber, with 1.0 mil thickness being preferred. The coating is a white color. The coating would be on the outside of each sheet 24 and 26.

A first seam structure 28 along the opposite longitudinal edges 18 and 20 secures the batt 22 between the sheets 24 and 26. With reference also to FIG. 4, the seam structure 28 includes an elongate band 30 of fabric extending along and surrounding the longitudinal edges of the sheets 24 and 26 which are compressed together and secured using a plurality of stitches 32.

A second seam structure 34 along opposite transverse edges of each panel 12, 14 or 16 is used to further secure the batt 22 between the sheets 24 and 26, with transverse edges of adjacent panels 12, 14 or 16 being secured together with such seam structure 34. The seam structure 34 comprises a band 36 of fabric material surrounding adjacent transverse edges. Particularly, as seen in FIG. 3a, the transverse edges of the adjacent panels 12 are turned up with their inner sheets 24 in surface contact with one another and the band 36 surrounding the edges of the outer sheets 26. This structure is held together using a plurality of stitches 38. A similar seam structure is provided between each set of adjacent panels 12, 14 and 16, as is particularly illustrated in FIG. 2.

The seam structures 34 comprise fold lines between adjacent panels for folding the quilt 10 into a stack, shown in FIG. 1, with the end panels 14 and 16 defining the outermost panels in the stack. Additional transverse fold lines 40 are provided centrally of each panel 12 intermediate opposite seam structures 34. The fold lines 40 permit each panel 12 to be folded to half size in the stack so that they are of a size similar to that of the end panels 14 and 16.

With reference also to FIG. 5, a top fabric cover 42 is secured to the outer sheet 26 of the first end panel 14. The top cover 42 has a width generally similar to that of the end panel 14, but is slightly longer. The cover 42 may be formed of vinyl, canvas or any other suitable material. A first self-locking strip 44 is secured to an outside of the top cover 42 at a rear longitudinal edge 46. An additional self-locking strip 48 is positioned to an underside of the top cover 42 at a front transverse edge 50. A pair of opposite longitudinal straps 52 and 54 are secured along adjacent longitudinal edges 18 and 20, respectively, each defining a pair of end loops 56. Extending transversely outwardly from each strap 52 and 54 is a shorter strap 58 and 60, respectively, including a quick release locking element or buckle 62 and 64, respectively, at a distal end thereof.

With reference also to FIG. 6, a bottom fabric cover 66 is fastened as by stitching to the outer cover sheet 26 of the front end panel 16. The bottom fabric cover 66 includes self-locking strips 68 and 70 similar to the corresponding self-locking strips 44 and 48 of the top cover 42, discussed above. More particularly, the self-locking strip 46 of the top cover 42 is mateable with the self-locking strip 70 of the bottom cover 66, while the self-locking strip 48 of the top cover 42 is mateable with the self-locking strip 68 of the bottom cover 66, as illustrated in FIG. 1, to temporarily secure the opposite end panels 14 and 16 together to maintain the stack of folded panels 12 therebetween for storage of the quilt 10.

A pair of opposite longitudinal straps 72 and 74 are secured along adjacent longitudinal edges 38 and 40, respectively, each defining a pair of end loops 76. Extending transversely outwardly from each strap 72 and 74 is a shorter strap 78 and 80, respectively, including a quick release locking element or buckle 82 and 84, respectively, at a distal end thereof. The buckle 62 is mateable with the buckle 82, as shown in FIG. 1. Similarly, the buckle 64 is mateable with the buckle 84. Thus, the self-locking strips and buckles are together used to maintain the quilt 10 in its stored configuration shown in FIG. 1 for easy storage of the same.

As discussed above, the quilt 10 can be used for insulating articles stored in a trailer, such as a trailer 100, see FIGS. 7a–7f. The trailer 100 is adapted to hold a plurality of articles 102, which may be suitably contained in containers or palletized, as necessary for the particular type of goods being shipped.

To use the quilt 10, the self-locking strips and buckles are first released with the quilt 10 otherwise being retained in a stack atop the containers 102 at a nose end 104 of the trailer 100. Particularly, the quilt 10 is positioned with the bottom cover 66 resting on the containers 102. A pair of cords 106 are tied to the end loops 56 of the top cover 42 and then are drawn along side walls 108 of the trailer 100. Each cord 106 may be temporarily adhered to the side wall 108, as at 110, using, for example, an adhesive tape. The trailer 100 is then filled with additional cartons 102, up to capacity, as shown in FIG. 7b. Thereafter, the cords 106 are pulled so that they are released from the sidewalls 108. The cords 106 are then continually pulled to unfold the quilt 10 as by pulling the top fabric 42 toward the rear of the trailer 100, as shown in FIG. 7c. This is continued until the quilt 10 is completely unfolded so that it extends across the tops of all of the containers 102 and extends down the rear side of the rearmost containers 102, as shown in FIG. 7d. The cords 106 are then removed and the bottommost flap, i.e., the rear end 46 of the top cover sheet 42, is tucked in and adhered to a self-locking strip 86 of the rear end panel 14, see FIG. 5, to prevent damage to the same.

Figure 7E:
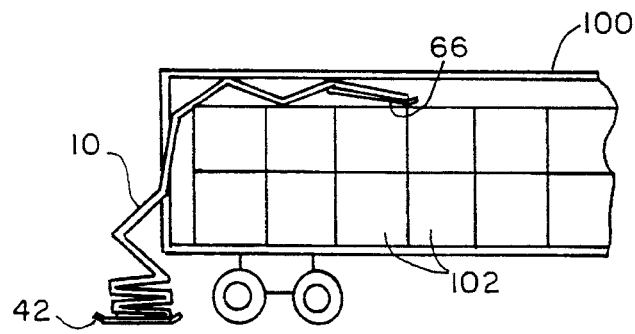
Figure 7F:
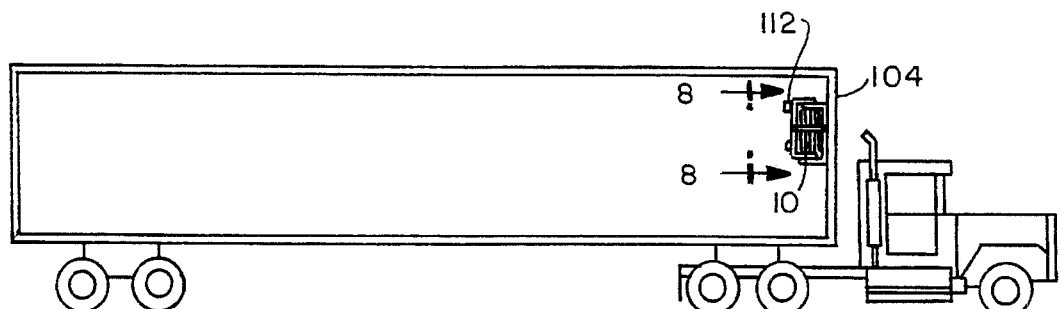
FIG. 7f is a view similar to that of FIG. 7a showing storage of the quilt in the semi-trailer truck.
Figure 8:
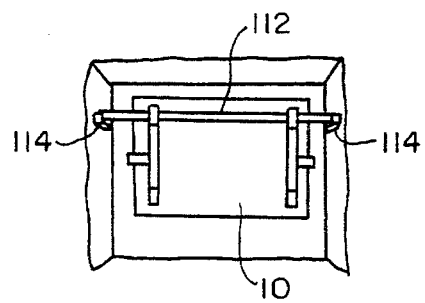
FIG. 8 is a detail view taken along the line 8—8 of FIG. 7f.

After shipment, the quilt 10 is removed by pulling on the top fabric cover 42 and laying it on its top side and continuing to draw the quilt rearwardly, folding it into a stack, as shown in FIG. 7e. Once fully removed and stacked, then the buckles and self-locking strips are secured together, see FIG. 1, for storage. The quilt 10 can then be returned as by shipping it directly to the owner of the same. Alternatively, if the quilt 10 is to remain with the trailer 100, then the loops 56 can be used to receive a rod 112, see FIGS. 7f and 8, which is held on brackets 114 at the trailer nose end 104.

With reference to FIG. 4a, a panel structure according to an alternative embodiment is illustrated. In this embodiment, two insulation bats 122 are provided between inner and outer cover sheets 124 and 125, respectively. An additional sheet 130 is provided between the two bats 122. This structure is secured together using the same seam structures discussed above. This structure provides additional insulation capability where necessary.

The quilt 10 according to the invention is used for minimizing temperature changes in goods being shipped. Particularly, the quilt 10 eliminates the requirement for using refrigerated or heated compartments for shipping goods when not absolutely necessary. For example, the quilt 10 can be used for shipping goods such as beer or wine or other food products which are not extremely temperature sensitive, but require minimal temperature swings during shipments. The quilt 10 satisfies the functions by using the disclosed structure for the quilt and renders doing so simpler by providing an easy storage of the quilt and loading of the quilt for covering the cargo to be shipped.

The disclosed embodiment of the invention illustrates the broad concepts comprehended hereby.

I claim:

1. An insulated freight container quilt comprising:

a plurality, greater than two, of insulated rectangular panels, each said panel comprising an insulation batt sandwiched between a lower sheet and an upper sheet;

means for securing said panels together to provide an elongate quilt, said panels being aligned seriatim with longitudinal edges in alignment and transverse edges of adjacent such panels being secured together;

means defining fold lines at said transverse edges of secured panels for folding the elongate quilt into a stack with opposite end panels defining outermost panels in the stack; and first fastening means on each of the opposite end panels along one of the edges thereof cooperating to releasably captively maintain the stack between the opposite end panels, and second fastening means on each of the opposite end panels along another edge thereof, opposite the one edge, cooperating to releasably captively maintain the stack between the opposite end panels, whereby to prevent unfolding of the stacked quilt.

2. The container quilt of claim 1 wherein said securing means comprises said panels being fastened together by stitches.

3. The container quilt of claim 1 wherein said folding means further comprises alternate transverse fold lines centrally located in said panels intermediate said transverse edges.

4. The container quilt of claim 1 wherein said opposite end panels are one half a longitudinal length of other said panels.

5. The container quilt of claim 1 wherein said fastening means comprises a fabric cover secured to one sheet of each of said opposite end panels.

6. The container quilt of claim 5 wherein said fastening means further comprises locking means secured at longitudinal edges of the covers for the opposite end panels for locking said covers together sandwiching the stack.

7. The container quilt of claim 1 wherein said fastening means further comprising self locking strips secured at transverse edges of the covers for the opposite end panels for locking said covers together sandwiching the stack.

8. The container quilt of claim 1 further comprising hanging straps secured to one of the end panels for storing the quilt in a shipping vehicle as by hanging the quilt using said straps.

9. An insulated freight container quilt comprising:

a plurality, greater than two, of insulated rectangular panels, each said panel comprising an insulation batt sandwiched between inner and outer sheets, said panels being aligned seriatim between opposite end panels with longitudinal edges in alignment;

a first seam structure along opposite longitudinal edges of each panel securing said batt between said sheets;

a second seam structure along opposite transverse edges of each panel securing said batt between said sheets, such transverse edges of adjacent panels being secured together to provide an elongate quilt;

means defining fold lines at said transverse edges of secured adjacent panels for folding the elongate quilt into a stack with said end panels defining outermost panels in the stack; and first securing means on each of the opposite end panels along one of the edges thereof cooperating to temporarily secure the opposite end panels together, and second securing means on each of the opposite end panels along another of the edges thereof, opposite the one edge, cooperating to temporarily secure the opposite end panels together, whereby said first and second securing means maintain the stack therebetween for storage of the quilt.

10. The container quilt of claim 9 wherein said seam structures comprise said panels being secured together by stitches.

11. The container quilt of claim 9 wherein said folding means further comprises alternate transverse fold lines centrally located in said panels intermediate said transverse edges.

12. The container quilt of claim 9 wherein said opposite end panels are one half a longitudinal length of the other said panels.

13. The container quilt of claim 9 wherein said securing means comprises a fabric cover secured to one sheet of each of said opposite end panels.

14. The container quilt of claim 13 wherein said securing means further comprises locking means secures at longitudinal edges of the covers for the opposite end panels for locking said covers together sandwiching the stack.

15. The container quilt of claim 9 wherein said securing means further comprising self locking strips secured at transverse edges of the covers for the opposite end panels for locking said covers together sandwiching the stack.

16. The container quilt of claim 9 further comprising hanging straps secured to one of the end panels for storing the quilt in a shipping vehicle as by hanging the quilt using said straps.

17. An insulated freight container quilt comprising:

- first and second elongate sheets coated on an outer side with polypropylene fiber, said sheets being of a material selected from a group consisting of spunbonded polypropylene and spunbonded polyester;
- a batt of polyester staple fibers bonded together with an acrylic binder, said batt being sandwiched between inner sides of said first and said second sheets;
- a seam structure along perimeter edges of said sheets securing said batt between said sheets.

18. The quilt of claim 17 further comprising a second batt of polyester staple fibers bonded together with an acrylic binder, said batt being sandwiched between inner sides of said first and said second cover sheets, and a third elongate cover sheet of a material selected from a group consisting of spunbonded polypropylene and spunbonded polyester sandwiched between said batts.

* * * * *